United States Patent
Cromer et al.

(10) Patent No.: US 6,263,373 B1
(45) Date of Patent: Jul. 17, 2001

(54) DATA PROCESSING SYSTEM AND METHOD FOR REMOTELY CONTROLLING EXECUTION OF A PROCESSOR UTILIZING A TEST ACCESS PORT

(75) Inventors: Daryl Carvis Cromer, Cary; Brandon Jon Ellison, Raleigh; Eric R. Kern, Durham; Howard Locker, Cary; Randall Scott Springfield, Chapel Hill, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/206,015

(22) Filed: Dec. 4, 1998

(51) Int. Cl.⁷ ...................................................... G09F 13/00
(52) U.S. Cl. .......................... 709/250; 709/219; 710/129; 712/38; 712/39; 714/30; 714/32
(58) Field of Search ..................................... 709/217, 219, 709/208, 209, 250; 710/72, 73, 100, 126, 129; 712/32, 36, 38, 39, 40; 714/25, 27, 30, 31, 32, 34, 35

(56) References Cited

U.S. PATENT DOCUMENTS

| | | | |
|---|---|---|---|
| 5,396,170 | * 3/1995 | D'Souza et al. | 324/158.1 |
| 5,740,413 | * 4/1998 | Alpert et al. | 712/227 |
| 5,752,013 | * 5/1998 | Christensen et al. | 712/227 |
| 5,933,594 | * 8/1999 | La Joie et al. | 714/25 |
| 6,055,661 | * 4/2000 | Luk | 714/736 |
| 6,070,253 | * 5/2000 | Tavallaei et al. | 714/31 |

* cited by examiner

Primary Examiner—Viet D. Vu
(74) Attorney, Agent, or Firm—George E. Grosser; Andrew Dillon

(57) ABSTRACT

A data processing system and method are described for remotely controlling execution of a processor utilizing the processor's built-in test access port for debugging the execution of the processor. The client computer system is coupled to a server computer system utilizing a network. The server computer system transmits a signal to said client computer system to control execution of the processor utilizing the test access port. The signal identifies one of a plurality of processor actions. In response to a receipt of the signal, the processor executes the one of the plurality of processor actions such that the server computer system remotely debugs the execution of the processor utilizing the built-in test access port, wherein additional debug hardware is not utilized.

13 Claims, 7 Drawing Sheets

DATA PROCESSING SYSTEM AND METHOD FOR REMOTELY CONTROLLING EXECUTION OF A PROCESSOR UTILIZING A TEST ACCESS PORT

CROSS-REFERENCE TO RELATED APPLICATIONS

The present invention is related to the subject matter of co-pending patent application Ser. No. 09/024,231, filed on Feb. 17, 1998, and entitled "FULL TIME NETWORK AUXILIARY PROCESSOR FOR A NETWORK CONNECTED PC", assigned to the assignee herein named, and herein incorporated by reference.

BACKGROUND OF THE INVENTION

1. Field of the Invention

The present invention relates in general to data processing systems and, in particular, to a data processing system and method including a server and client computer system coupled together utilizing a local area network. Still more particularly, the present invention relates to a data processing system and method including a server and client computer system coupled together utilizing a local area network for remotely controlling execution of a processor utilizing the processor's built-in test access port for debugging the execution of the processor.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

With PCs being increasingly connected into networks to allow transfers of data among computers to occur, more operations such as maintenance, updating of applications, and data collections are occurring over the network. Computer networks are also becoming essential to their user. It is desirable minimize loss of productivity by increasing availability of network resources.

For code development and problem resolution, the ability to read/write registers in a processor and to set break points is essential. The first tools were In Circuit Emulators which replaced the processor under test with early processors such as the 8086 and 8088. External bus snoopers were created for the 386 and 486 family of processors. The Pentium family of processors have built-in debugging tools which are accessed via a test access port (TAP). The TAP complies with the IEEE 1149.1 (JTAG) test architecture standard.

One prior solution to testing execution of a processor was to add a connector to the planar to allow access to the processor included on the planar. The planar under test was then attached via a ribbon cable to a computer having a TAP adapter interface and application software.

This solution has the disadvantage of significant added cost. Although the cost of a single connector may only be $0.50, the added cost for mass producing one million computer systems with this solution is $500,000.

Another disadvantage is that the system and developer must be in close proximity. The debug cable can only drive a length of three feet. Thus, the developer and system under test must be physically close together, i.e. within three feet. Yet another disadvantage is the requirement that a master system exist for each client system. Typically this requires a debug station to be time-shared due to cost considerations. In addition, the developer may only test a single system at a time.

Therefore a need exists for a data processing system and method for remotely controlling and debugging execution of a processor utilizing the processor's built-in test access port without significant additional cost.

SUMMARY OF THE INVENTION

A data processing system and method are described for remotely controlling execution of a processor utilizing the processor's built-in test access port for debugging the execution of the processor. The client computer system is coupled to a server computer system utilizing a network. The server computer system transmits a signal to said client computer system to control execution of the processor utilizing the test access port. The signal identifies one of a plurality of processor actions. In response to a receipt of the signal, the processor executes the one of the plurality of processor actions such that the server computer system remotely debugs the execution of the processor utilizing the built-in test access port wherein additional debug hardware is not utilized.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is a method and system for a server computer system remotely controlling execution of a processor included within a client computer system for debugging the execution of the processor. The processor includes a built-in test access port. The execution of the processor may be controlled through the test access port (TAP). For example, the TAP may be utilized to read or write registers included within the processor and/or to set a break point which when reached causes the processor to halt execution. Other commands may be utilized to control the execution of the processor.

The present invention describes a server computer transmits a network packet to a client including one of a plurality of debug commands. The client computer system includes a special purpose processor. In response to the client receiving this signal, the special purpose processor determines one of a plurality of test access port commands associated with the received debug command. Then, the special purpose processor outputs the associated test access port command. The processor receives the test access port command and executes an action associated with the command. For example, the test access command may cause the processor to dump memory, dump register, halt, go, reset, or set a break point. The processor then takes the associated action, and may transmit data back to the special purpose processor.

Figure 1:
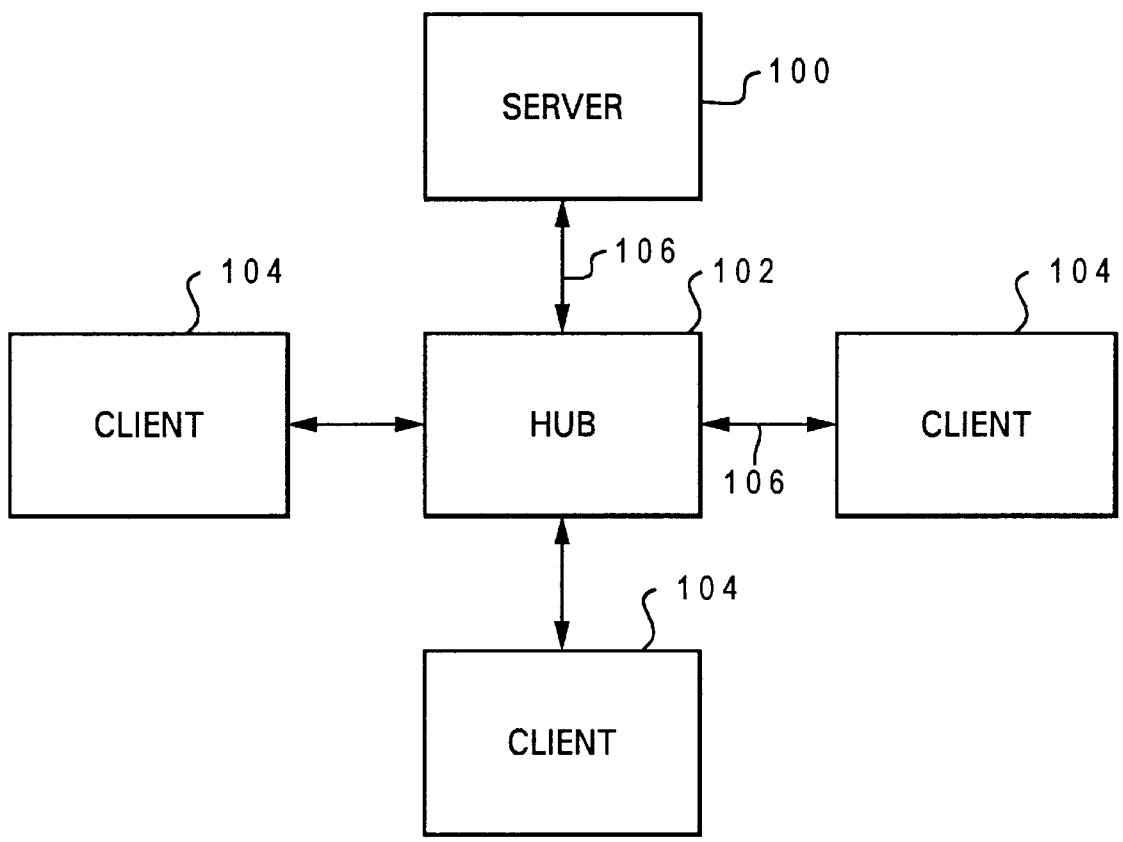
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

A "network" may include any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Figure 2:
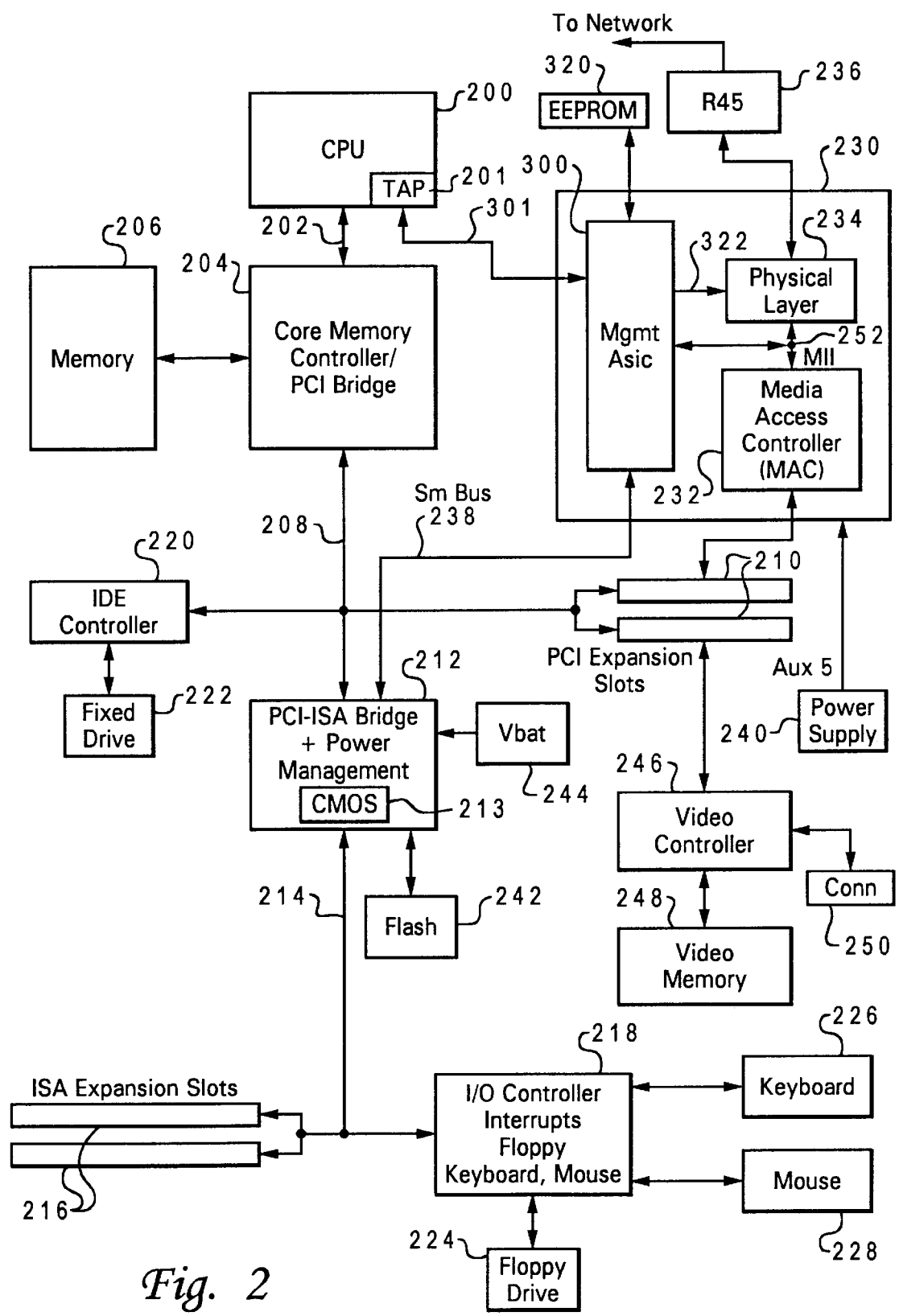
FIG. 2 depicts a pictorial representation of a processor including a test access port and a network adapter included within a client computer system in accordance with the method and system of the present invention.

FIG. 2 illustrates a pictorial representation of a processor 200 including a test access port 201, and a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is coupled to system memory 206. Processor 200 includes a TAP 201. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes BIOS that is used to interface between the I/O devices and operating system. PCI-ISA bridge controller 212 also includes storage 213, which is preferably implemented utilizing CMOS storage, that holds the BIOS settings. Storage 213 includes values which describe the present configuration of client 104. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 204 is supplied power from battery 244 to prevent loss of configuration data in storage 213.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a power supply 240 which supplies full normal system power, and has an auxiliary power main AUX 5 which supplies full time power to the power management logic 212 and to the network adapter 230. This enables client 104 to respond to a wakeup signal from network adapter 230. In response to a receipt of the wakeup signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a service processor, or special purpose processor, 300 coupled to the MII bus 252 between physical layer 234 and MAC 232. Service processor 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

ASIC 300 is coupled to TAP 201 utilizing bus 301. In this manner, ASIC 300 may send test access port commands to and receive data from TAP 201, and thus processor 200.

Data from client computer system 104 is accessed by ASIC 300 over a system management bus (SM) 238. System management bus 238 is a two-wire, low-speed serial bus used to interconnect management and monitoring devices. With the trickle power supplied by signal AUX 5 from power supply 240, ASIC 300 is preferably powered full time. Micro-controller 302 (shown in FIG. 3) included within ASIC 300 is coupled to bridge controller 212 via the System Management (SM) bus 238 through SM bus interface 316. This provides a path to allow software running on client 104 to access ASIC and EEPROM 320.

Figure 3:
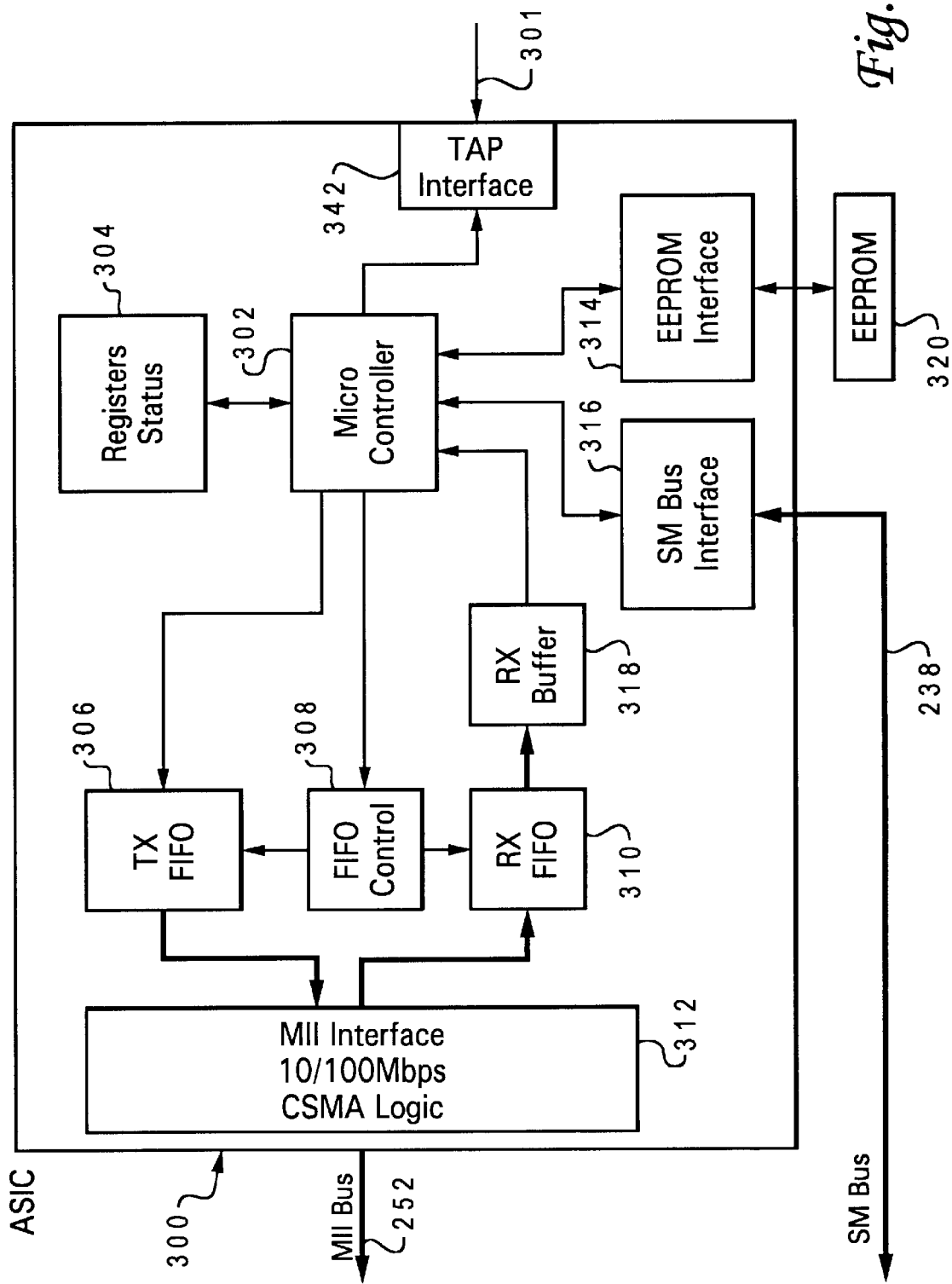
FIG. 3 illustrates a pictorial representation of a special purpose processing unit which is included within a network adapter included within a client computer system in accordance with the method and system of the present invention.

FIG. 3 illustrates a pictorial representation of special purpose processing unit 300 which is included within a network adapter 230 included within a client computer system 104 in accordance with the method and system of the present invention. Special purpose processing unit is preferably implemented utilizing an ASIC 300 which includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests from software running on client 104 to access register status 304 or access EEPROM 320. Signals are received from the MII bus 252 by interface unit 312 and passed to RX FIFO 310.

Micro-controller 302 accesses EEPROM 320 through EEPROM interface 314 to obtain values to create network packets such as source and destination MAC addresses, IP protocol information, authentication headers, and Universal Data Packet headers. Further, EEPROM 320 retains the Universal Unique Identifier (UUID). TAP bus 301 is connected to TAP interface 342 which is connected to micro-controller 302. This allows ASIC 300 to send and receive commands to TAP 201 in CPU 200.

Figure 4A:
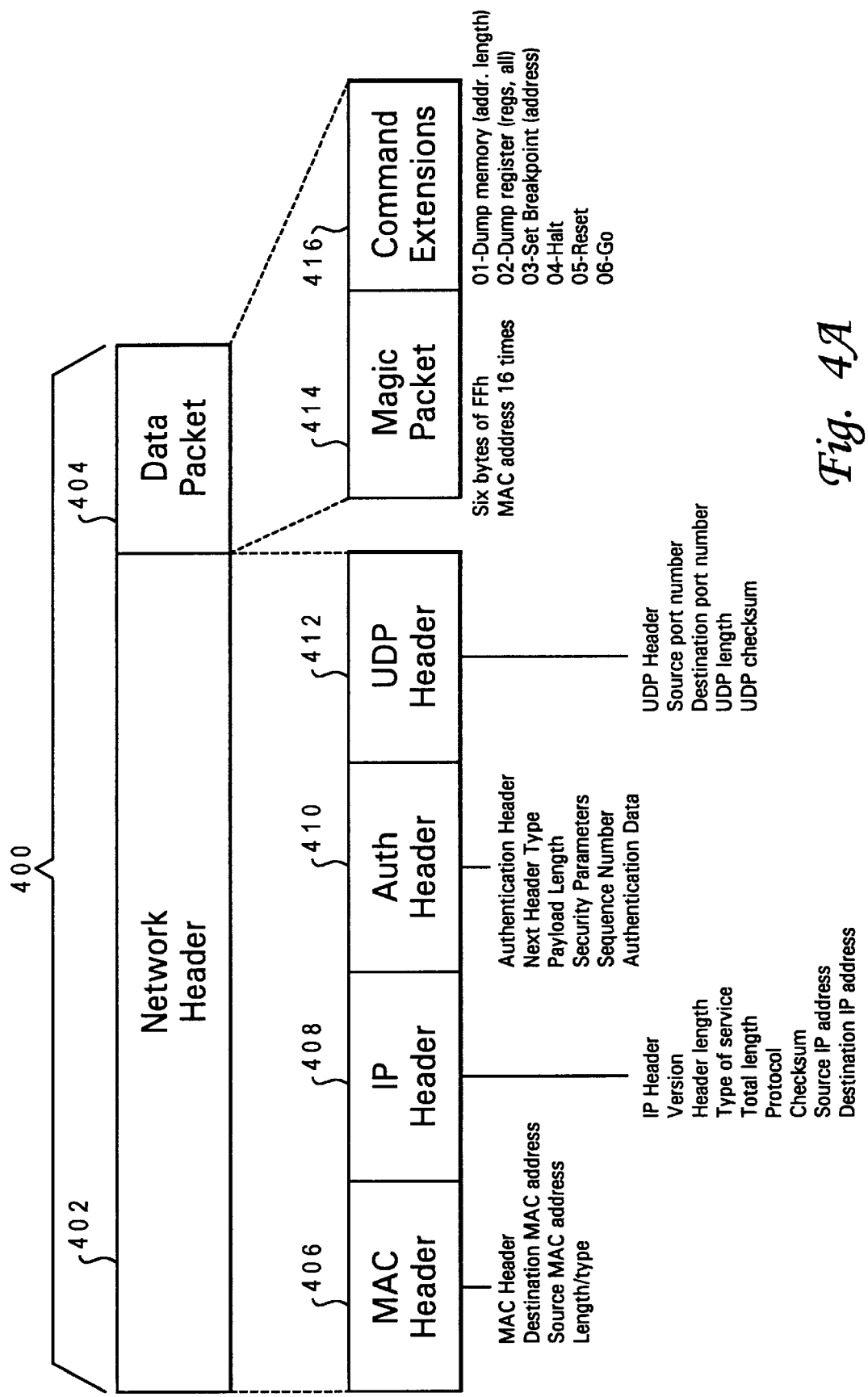
FIG. 4A illustrates a pictorial representation of a network packet, including a network header and a data packet, which may be transmitted by a server computer system over the network in accordance with the method and system of the present invention.

FIG. 4A illustrates a pictorial representation of a network packet 400, including a network header 402 and a data packet 404, which may be transmitted by a server computer system over the network in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also may include command extensions 416. Command extensions includes one of a plurality of debug commands, such as a dump memory, dump registers, set break point, halt, reset, or a go command. Server computer system 100 may specify one of a plurality of command extensions in data packet 404 in order to cause ASIC 300 to transmit a TAP command associated with the debug command to TAP 201.

When a network packet 400 is received by client 104, it is received by physical layer 234 and placed on the MII bus 252. When network packet 400 includes magic packet 414, MAC 232 detects that it includes magic packet 414, and then MAC 232 ignores any command extensions 416.

ASIC 300 also receives network packet 400 utilizing the MII interface 312. Data packet 404 is transferred to RX FIFO 310 and then to RX buffer 318. Micro-controller 302 then inspects data packet 404 and determines whether data packet 404 includes command extensions 416. If command extensions 416 are included, the appropriate function is executed in accordance with the description which follows.

The command extensions are debug commands which are processed by ASIC 300. ASIC 300 determines an appropriate TAP command associated with the received debug command, and outputs the TAP command to TAP 201 utilizing lines 301.

Figure 4B:
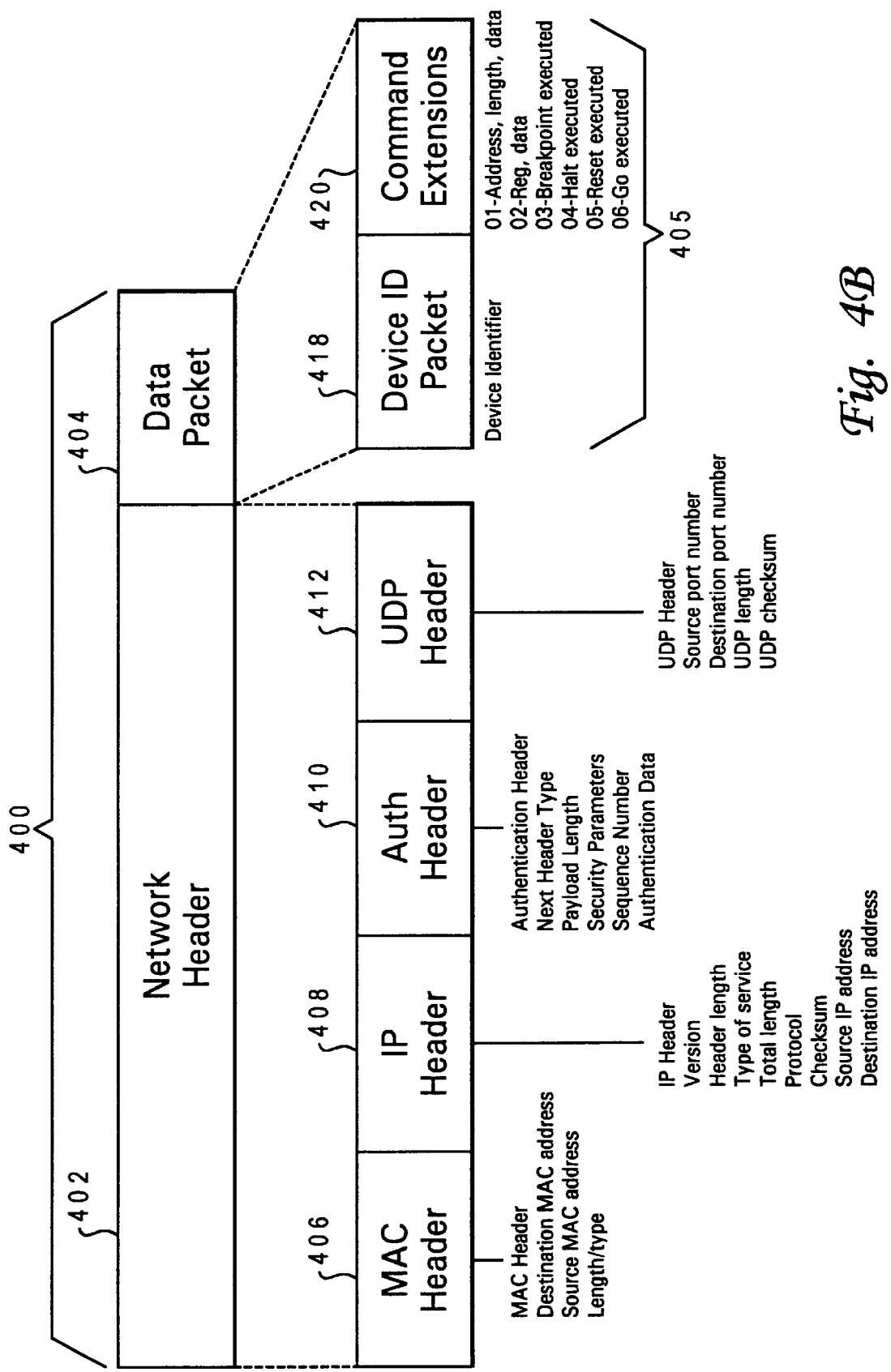
FIG. 4B illustrates a pictorial representation of a network packet, including a network header and a data packet, which may be transmitted by a client computer system over the network in accordance with the method and system of the present invention.

FIG. 4B illustrates a pictorial representation of a network packet, including a network header and a data packet, which may be transmitted by a client computer system over the network in accordance with the method and system of the present invention. Each network packet 400 includes a network header 402, as described above, and a data packet 405.

Data packet 405 includes a device identifier packet 418 and command extensions 420. Packet 418 includes an identifier which identifies the particular client which created and transmitted this packet. Data packet 405 also includes command extensions 420. Command extensions includes one of a plurality of responsive commands client may transmit to indicate that a particular action was completed along with any information received in response to that action. For example, if the client received a command as described above to dump memory, the client will create and transmit a responsive packet indicating the address, length, and memory data received when the dump memory command was executed by the processor. Similarly, dump registers, set break point, halt, reset, go will result in responsive packets which indicate the register and data received, or that the break point, halt, reset, or go was executed.

Figure 5:
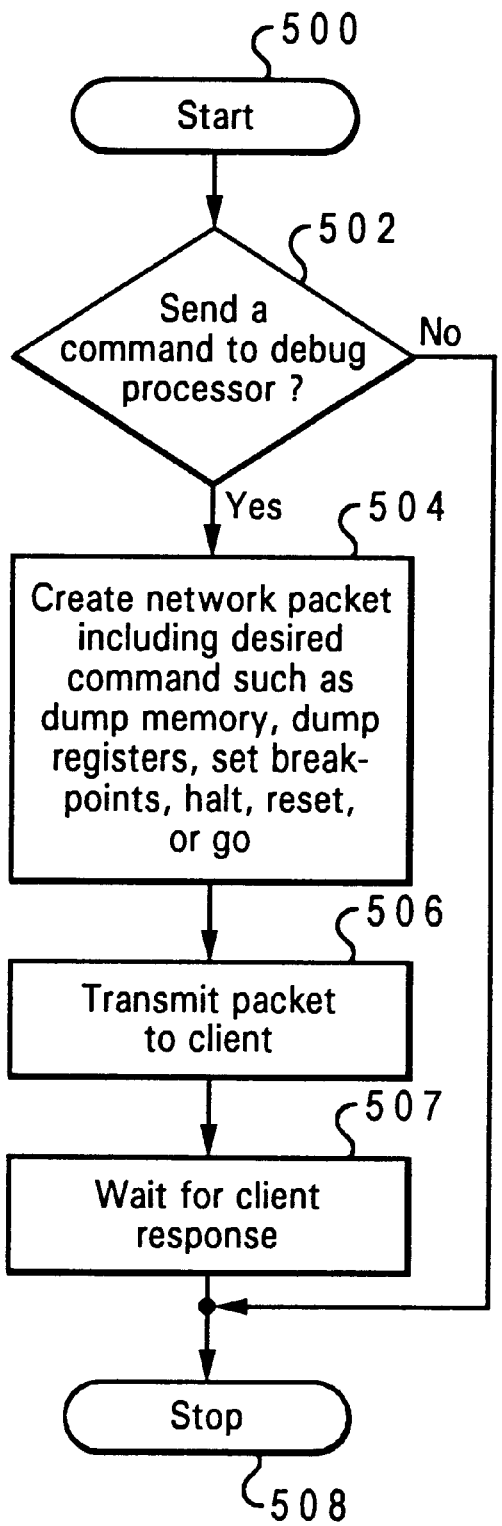
FIG. 5 depicts a high level flow chart which illustrates a server computer system transmitting a command to remotely control execution of a client computer system's processor in accordance with the method and system of the present invention.

FIG. 5 illustrates a high level flow chart which depicts a server computer system transmitting a command to remotely control execution of a client computer system's processor in accordance with the method and system of the present invention. The process starts as depicted by block 500 and thereafter passes to block 502 which illustrates a determination of whether or not the server is to transmit a network packet to a client computer system which includes a command to debug the client's processor. If a determination is made that the server is not to transmit such packet, the process terminates as depicted by block 508.

Referring again to block 502, if a determination is made that the server is to transmit a network packet to a client including a command to debug the client's processor, the process passes to block 504 which illustrates a creation of a network packet including the desired debug command. For example, the debug command may be a dump memory, dump register, set break point, halt, reset, or go command. The desired command is included within the network packet transmitted by the server. Next, block 506 depicts the transmission of the packet to the client computer system. Thereafter, block 507 illustrates the server waiting for a response from the client. The process then terminates as illustrated by block 508.

Figure 6:
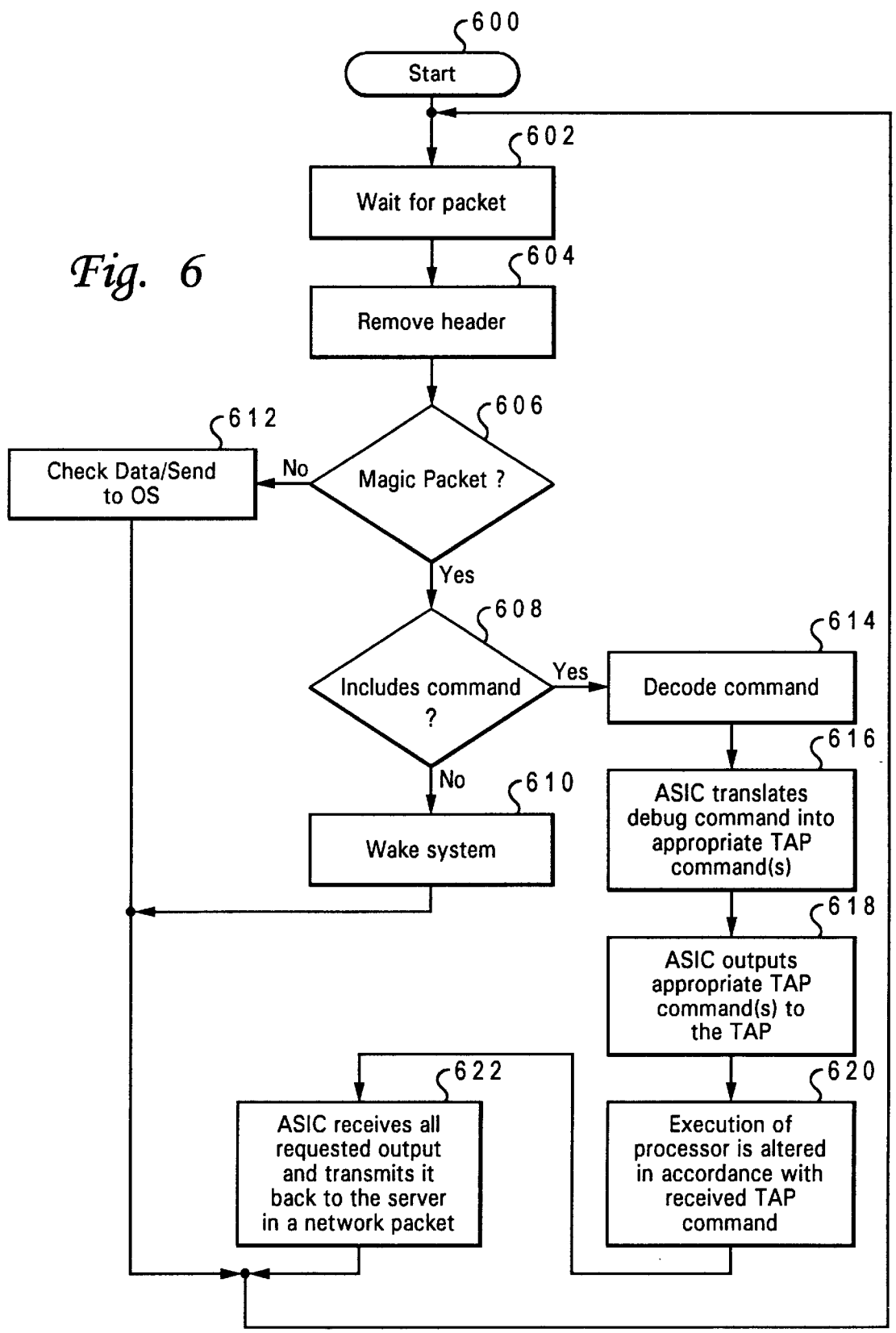
FIG. 6 illustrates a high level flow chart which depicts execution of a client computer system's processor being altered in accordance with a command received from a server computer system in accordance with the present invention.

FIG. 6 illustrates a high level flow chart which depicts execution of a client computer system's processor being altered in accordance with a command received from a server computer system in accordance with the present invention. The process starts as depicted by block 600 and thereafter passes to block 602 which illustrates a microcontroller 302 included within a client computer system waiting to receive network packet 400. When the packet has been received, physical layer 234 places data packet 404 included within network packet 400 on the MII bus 252. The MII bus 252 is read by MII interface 312 of ASIC 300. ASIC 300 transfers data packet 404 from MII interface 312 to RX FIFO 310 and to RX buffer 318.

The process then passes to block 604 which depicts micro-controller 302 removing network header 402 from the packet. Next, block 606 illustrates a determination by micro-controller 302 whether data packet 404 included magic packet 414. If a determination is made that data packet 404 did not include magic packet 414, the process passes to block 612 which depicts the data included within data packet 404 being sent to the operating system (OS). The process then passes back to block 602.

Referring again to block 606, if a determination is made that data packet 404 did include magic packet 414, the process passes to block 608 which illustrates a determination of whether or not data packet 404 also included additional commands 416. If a determination is made that data packet 404 does not include any additional commands 416, the process passes to block 610 which depicts the transmission of a wakeup command which will cause the client to power up. The process then passes back to block 602.

Referring again to block 608, if a determination is made that data packet 404 does include additional commands 416, the process passes to block 614 which depicts the decoding of the additional commands 416. Next, block 616 illustrates ASIC 300 translating the received debug command extension into the associated TAP command(s). Thereafter, block 618 depicts ASIC 300 outputting the TAP command(s) utilizing test access port bus 301 to test access port 201 included within processor 200.

Block 620 illustrates the execution of processor 200 being altered in accordance with the signal received by its test access port 201. For example, when a break point command is sent by server 100 such as (break 0123-0017), the processor will execute instructions until the break address is reached. Then processor halts execution. The process then passes to block 622 which depicts ASIC 300 receiving all information requested from processor 200 and transmitting that information back to server 100 in a network packet. The process then passes back to block 602.

While a preferred embodiment has been particularly shown and described, it will be understood by those skilled in the art that various changes in form and detail may be made therein without departing from the spirit and scope of the present invention.

What is claimed is:

1. A method in a data processing system for remotely controlling execution of a processor included within a client computer system for debugging said execution of said processor, said processor having a built-in test access port, said client computer system being coupled to a server computer system utilizing a network, said method comprising the steps of:

said server computer system transmitting a network packet including a signal to said client computer system to control execution of said processor utilizing said test access port, said signal including one of a plurality of debug commands identifying one of a plurality of processor actions;

said client computer system receiving said network packet which includes said signal utilizing a special purpose processor included within a network adapter included within said client computer system; and in response to a receipt of said signal, said special purpose processor determining one of a plurality of test access port commands associated with said one of said plurality of debug commands and causing said processor to execute said one of said plurality of processor actions, wherein said server computer system remotely debugs said execution of said processor utilizing said built-in test access port wherein additional debug hardware is not utilized.

2. The method according to claim 1, further comprising the steps of:

said special purpose processor outputting said one of said plurality of test access port commands to said test access port; and in response to a receipt of said one of said plurality of test access port commands, said processor executing said one of said processor actions.

3. The method according to claim 2, wherein said step of said server computer system transmitting said signal including one of a plurality of debug commands further comprises the step of said server computer system transmitting said signal including a dump memory command, and further wherein the step of in response to a receipt of said one of said plurality of test access port commands associated with said dump memory command, said processor transmits a portion of a memory included with said client computer system to said special purpose processing unit.

4. The method according to claim 3, wherein said step of said server computer system transmitting said signal including one of a plurality of debug commands further comprises the step of said server computer system transmitting said signal including a halt command, and further wherein the step of in response to a receipt of said one of said plurality of test access port commands associated with said halt command, said processor halting execution.

5. The method according to claim 4, wherein said step of said server computer system transmitting said signal including one of a plurality of debug commands further comprises the step of said server computer system transmitting said signal including a set break point command, and further wherein the step of in response to a receipt of said one of said plurality of test access port commands associated with said set break point command, said processor halting execution upon said processor reaching said break point.

6. A data processing system for remotely controlling execution of a processor included within a client computer system for debugging said execution of said processor, said processor having a built-in test access port, said client computer system being coupled to a server computer system utilizing a network, comprising:

said server computer system executing code for transmitting a network packet including a signal to said client computer system to control execution of said processor utilizing said test access port, said signal including one of a plurality of debug commands identifying one of a plurality of processor actions;

a special purpose processor included within a network adapter in said client computer system for receiving said network packet which includes said signal; and in response to a receipt of said signal, said special purpose processor configured to determine one of a plurality of test access port commands associated with said one of a plurality of debug commands and causing said processor to execute said one of said plurality of processor actions, wherein said server computer system remotely debugs said execution of said processor utilizing said built-in test access port wherein additional debug hardware is not utilized.

7. The system according to claim 6, further comprising:

said special purpose processor executing code for outputting said one of said plurality of test access port commands to said test access port; and in response to a receipt of said one of said plurality of test access port commands, said processor configured to execute said one of said processor actions.

8. The system according to claim 7, further comprising said server computer system executing code for transmitting said signal including a dump memory command, and in response to a receipt of said dump memory command, said processor configured to transmit a portion of a memory included with said client computer system to said special purpose processing unit.

9. The system according to claim 8, further comprising said server computer system executing code for transmitting said signal including a halt command, and in response to a receipt of said halt command, said processor configured to halt execution.

10. The system according to claim 9, further comprising said server computer system executing code for transmitting said signal including a set break point command, and in response to a receipt of said set break point command, said processor configured to halt execution upon said processor reaching said break point.

11. A data processing system including a server computer system coupled to a client computer system utilizing a network, comprising:

said client computer system a processor having a test access port for receiving one of a plurality of test access port commands for controlling execution of said processor, said one of said plurality of test access port commands causing said processor to execute one of a plurality of processor actions;

a network adapter including within said client computer system, said network adapter including a network controller and a special purpose processing unit coupled to said network controller, said network controller configured to receive and transmit network packets utilizing said network to and from said server computer system;

said network controller configured to receive a network packet from said server computer system, said network packet including a magic packet and one of a plurality of debug commands;

said special purpose processor executing code for determining one of said plurality of test access port commands which is associated with said one of said plurality of debug commands;

said special purpose processor executing code for outputting said one of said plurality of test access port commands to said test access port; and in response to a receipt of said one of said plurality of test access port commands, said processor configured to execute said one of said processor actions.

12. The method according to claim 1, further comprising the step of said server computer system transmitting a network packet which conforms to the Ethernet standard to said client computer system, and wherein said network adapter conforms to the Ethernet standard.

13. The system according to claim 6, wherein said network, said network packet, and said network adapter conform to the Ethernet standard.

* * * * *